United States Patent
Hua et al.

(10) Patent No.: US 12,346,326 B2
(45) Date of Patent: Jul. 1, 2025

(54) POINT CLOUD MATCHING METHOD AND APPARATUS, ELECTRONIC APPARATUS, AND STORAGE MEDIUM

(71) Applicant: ZHEJIANG LAB, Hangzhou (CN)

(72) Inventors: Wei Hua, Hangzhou (CN); Qibo Qiu, Hangzhou (CN); Jin Shi, Hangzhou (CN); Haiming Gao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/527,875

(22) Filed: Dec. 4, 2023

(65) Prior Publication Data

US 2025/0036628 A1  Jan. 30, 2025

Related U.S. Application Data

(63) Continuation of application No. PCT/CN2023/119279, filed on Sep. 18, 2023.

(30) Foreign Application Priority Data

Jul. 28, 2023 (CN) .......................... 202310940230.5

(51) Int. Cl.
 *G06F 16/2455* (2019.01)
 *G06F 16/28* (2019.01)
(52) U.S. Cl.
 CPC .......... *G06F 16/2455* (2019.01); *G06F 16/28* (2019.01)
(58) Field of Classification Search
 CPC .............................. G06F 16/2455; G06F 16/28
 See application file for complete search history.

(56) References Cited

U.S. PATENT DOCUMENTS

2023/0121226 A1  4/2023 Schroeter

FOREIGN PATENT DOCUMENTS

| CN | 104063702 A | | 9/2014 |
|---|---|---|---|
| CN | 104298971 A | | 1/2015 |
| CN | 114022525 A | | 2/2022 |
| CN | 115797419 A | | 3/2023 |
| CN | 116228704 A | * | 6/2023 |
| CN | 116320357 A | * | 6/2023 |
| CN | 116664645 A | | 8/2023 |

OTHER PUBLICATIONS

International Search Report of PCT/CN2023/119279.

* cited by examiner

*Primary Examiner* — Tony Wu

(57) ABSTRACT

A point cloud matching method and apparatus, an electronic apparatus, and a storage medium are provided. The point cloud matching method includes: dividing a to-be-matched point cloud into a plurality of matched point cloud patches, and inputting the plurality of matched point cloud patches to a pre-trained point cloud feature coding module to obtain feature vectors of the plurality of matched point cloud patches; and acquiring a global description vector of the to-be-matched point cloud according to the feature vectors of the plurality of matched point cloud patches, matching the global description vector of the to-be-matched point cloud with global description vectors of point cloud frames in a preset historical database, and determining a point cloud frame in the historical database within a preset matching threshold range to be a point cloud matching result.

16 Claims, 5 Drawing Sheets

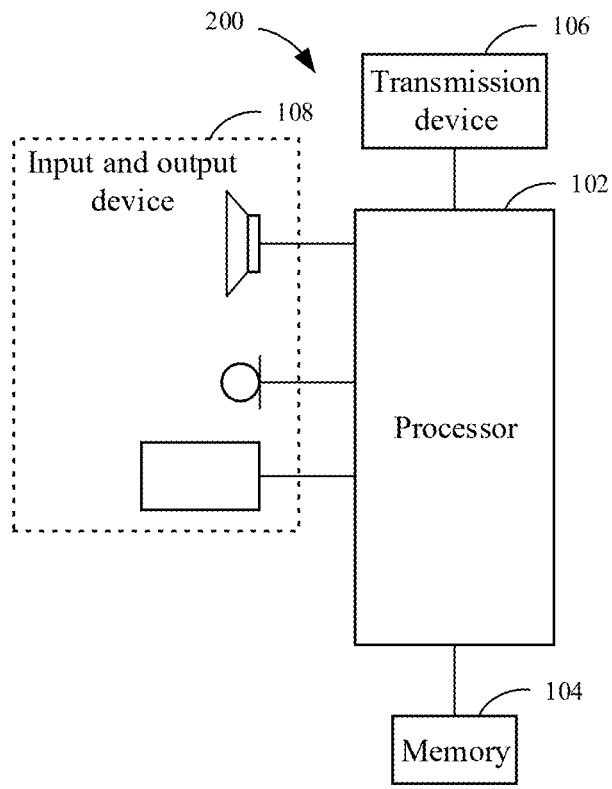

FIG. 1

| Dividing a to-be-matched point cloud into a plurality of matched point cloud patches, and inputting the plurality of matched point cloud patches to a pre-trained point cloud feature coding module to obtain feature vectors of the plurality of matched point cloud patches; and during pre-training of the point cloud feature coding module, to-be-trained training point cloud patches after being masked according to a preset masking rate being input into the point cloud feature coding module, and feature vectors of visible point cloud patches and feature vectors of masked point cloud patches being output from the point cloud feature coding module respectively to train the point cloud feature coding module | S210 |

↓

| Acquiring a global description vector of the to-be-matched point cloud according to the feature vectors of the plurality of matched point cloud patches, matching the global description vector of the to-be-matched point cloud with global description vectors of point cloud frames in a preset historical database, and determining a point cloud frame in the historical database within a preset matching threshold range to be a point cloud matching result | S220 |

FIG. 2

US 12,346,326 B2

POINT CLOUD MATCHING METHOD AND APPARATUS, ELECTRONIC APPARATUS, AND STORAGE MEDIUM

CROSS-REFERENCE TO RELATED APPLICATIONS

This application is a continuation of international patent application No. PCT/CN2023/119279, filed on Sep. 18, 2023, which itself claims priority to Chinese patent applications No. 202310940230.5, filed on Jul. 28, 2023, titled "POINT CLOUD MATCHING METHOD AND APPARATUS, ELECTRONIC APPARATUS, AND STORAGE MEDIUM". The contents of the above applications are hereby incorporated by reference.

TECHNICAL FIELD

The present disclosure generally relates to a field of point cloud matching, and in particular, to a point cloud matching method and apparatus, an electronic apparatus, and a storage medium.

BACKGROUND

A point cloud is a three-dimensional geometric data set composed of a group of points. The point cloud may represent information such as a shape, a surface, and a contour of an object, and is an important data form in fields such as computer vision, robotics, and virtual reality. The point cloud may be acquired directly from a sensor (such as a lidar or an RGB-Depth (RGB-D) camera), or may be generated by technologies such as three-dimensional reconstruction and three-dimensional scanning.

Point cloud matching is mainly achieved by comparing similarities between global features of a current point cloud and historical point clouds. Thanks to rapid development of deep learning, at present, global features of a point cloud are mainly extracted by a neural network, but influence of neighboring points is not considered in feature extraction. In this regard, there are two main ideas to solve the problem: K nearest neighbor and three-dimensional sparse convolution. However, such algorithms are all supervised deep learning algorithms, and training data thereof is required to mark with distance relationships in a real three-dimensional space, so an additional positioning sensor needs to be mounted, which increases device costs, and does not support offline data collection and training and cannot achieve out-of-the-box performance of the algorithms in many scenarios such as Simultaneous Localization and Mapping (SLAM). Therefore, a point cloud matching technology based on supervised deep learning has lower matching accuracy.

For the issue of low matching accuracy of the point cloud matching technology based on supervised deep learning in the related art, no effective solution has yet been proposed at present.

SUMMARY

According to various embodiments of the present disclosure, a point cloud matching method and apparatus, an electronic apparatus, and a storage medium are provided.

In a first aspect, a point cloud matching method is provided in the present embodiment, including:
dividing a to-be-matched point cloud into a plurality of matched point cloud patches, and inputting the plurality of matched point cloud patches to a pre-trained point cloud feature coding module to obtain feature vectors of the plurality of matched point cloud patches; and during pre-training of the point cloud feature coding module, to-be-trained training point cloud patches after being masked according to a preset masking rate being input into the point cloud feature coding module, and feature vectors of visible point cloud patches and feature vectors of masked point cloud patches being output from the point cloud feature coding module respectively to train the point cloud feature coding module; and
acquiring a global description vector of the to-be-matched point cloud according to the feature vectors of the plurality of matched point cloud patches, matching the global description vector of the to-be-matched point cloud with global description vectors of point cloud frames in a preset historical database, and determining a point cloud frame in the historical database within a preset matching threshold range to be a point cloud matching result.

In some embodiments, the dividing the to-be-matched point cloud into the plurality of matched point cloud patches further includes:
filtering the to-be-matched point cloud according to a preset height and radius;
voxelizing a filtered to-be-matched point cloud according to preset spatial resolution;
sampling a voxelized to-be-matched point cloud, and determining a plurality of points after sampling to be key points; and
dividing the to-be-matched point cloud into the plurality of matched point cloud patches according to the key points and a set of points within a preset range of the key points.

In some embodiments, the dividing the to-be-matched point cloud into the plurality of matched point cloud patches, and inputting the plurality of matched point cloud patches to the pre-trained point cloud feature coding module to obtain the feature vectors of the plurality of matched point cloud patches further includes:
inputting the plurality of matched point cloud patches to a preset linear dimension raising layer to acquire matched point cloud patches dimension-raised to a preset dimension; and
inputting the matched point cloud patches dimension-raised to the preset dimension to a preset first self-attention layer to obtain the feature vectors of the plurality of matched point cloud patches.

In some embodiments, the acquiring the global description vector of the to-be-matched point cloud according to the feature vectors of the plurality of matched point cloud patches further includes:
acquiring a plurality of distance vectors from a preset vector library, and the distance vectors being vectors whose distances from the feature vectors of the plurality of matched point cloud patches are within a preset distance threshold range; and
splicing the feature vectors of the plurality of matched point cloud patches with the plurality of distance vectors to obtain the global description vector of the to-be-matched point cloud.

In some embodiments, prior to the dividing the to-be-matched point cloud into the plurality of matched point cloud patches, and inputting the plurality of matched point cloud patches to the pre-trained point cloud feature coding module, the method further includes:

filtering a to-be-trained point cloud according to a preset height and radius;

voxelizing a filtered to-be-trained point cloud according to preset spatial resolution;

sampling a voxelized to-be-trained point cloud, and determining a plurality of points after sampling to be key points;

dividing the to-be-trained point cloud into a plurality of training point cloud patches according to the key points and a set of points within a preset range of the key points;

masking the plurality of training point cloud patches according to a preset masking rate to obtain first point cloud patches and second point cloud patches, the first point cloud patches being visible point cloud patches, and the second point cloud patches being masked point cloud patches;

obtaining prediction information of the second point cloud patches according to information of the first point cloud patches and information of the second point cloud patches; and obtaining a prediction loss according to the information of the second point cloud patches and the prediction information of the second point cloud patches, and training the point cloud feature coding module according to the prediction loss.

In some embodiments, the obtaining the prediction information of the second point cloud patches according to the information of the first point cloud patches and the information of the second point cloud patches further includes:

inputting coordinates of key points in the first point cloud patches to a preset visible position coding layer to obtain position code of the first point cloud patches;

inputting coordinates of key points in the second point cloud patches to a preset mask position coding layer to obtain position code of the second point cloud patches;

inputting the first point cloud patches and the second point cloud patches to a preset linear dimension raising layer to obtain first point cloud patches and second point cloud patches dimension-raised to a preset dimension;

inputting the first point cloud patches dimension-raised to the preset dimension to a preset first self-attention layer to obtain the feature vectors of the first point cloud patches;

adding the feature vectors of the first point cloud patches and the position code of the first point cloud patches, and splicing an addition result with the position code of the second point cloud patches to obtain a tensor of the to-be-trained point cloud; and inputting the tensor of the to-be-trained point cloud to a preset second self-attention layer to obtain predicted feature vectors of the second point cloud patches, and the predicted feature vectors being the prediction information.

In some embodiments, the obtaining the prediction loss according to the information of the second point cloud patches and the prediction information of the second point cloud patches further includes:

acquiring a plurality of original vectors in the predicted feature vectors of the second point cloud patches and feature vectors of the second point cloud patches, acquiring replacement vectors corresponding to the plurality of original vectors from a preset vector library, and replacing the plurality of original vectors with the replacement vectors; and the feature vectors of the second point cloud patches being obtained by inputting the second point cloud patches dimension-raised to the preset dimension to the preset first self-attention layer;

determining replaced feature vectors and predicted feature vectors of the second point cloud patches to be semantics of the second point cloud patches and predicted semantics of the second point cloud patches respectively;

calculating a squared error between the semantics of the second point cloud patches and the predicted semantics of the second point cloud patches, and the squared error being a first prediction loss;

inputting the feature vectors of the second point cloud patches to a preset third self-attention layer and a linear dimension reducing layer to obtain predicted coordinates of each point in the second point cloud patches after dimension reduction;

calculating a chamfer distance between coordinates of the second point cloud patches and predicted coordinates of the second point cloud patches, and the chamfer distance being a second prediction loss; and determining a sum of the first prediction loss and the second prediction loss to be the prediction loss.

In a second aspect, a point cloud matching apparatus is provided in the present embodiment, including:

means for dividing a to-be-matched point cloud into a plurality of matched point cloud patches, and inputting the plurality of matched point cloud patches to a pre-trained point cloud feature coding module to obtain feature vectors of the plurality of matched point cloud patches; and during pre-training of the point cloud feature coding module, to-be-trained training point cloud patches after being masked according to a preset masking rate being input into the point cloud feature coding module, and feature vectors of visible point cloud patches and feature vectors of masked point cloud patches being output from the point cloud feature coding module, respectively; and means for acquiring a global description vector of the to-be-matched point cloud according to the feature vectors of the plurality of matched point cloud patches, matching the global description vector of the to-be-matched point cloud with global description vectors of point cloud frames in a preset historical database, and determining a point cloud frame in the historical database within a preset matching threshold range to be a point cloud matching result.

In a third aspect, an electronic apparatus is provided in the present embodiment, including a memory, a processor, and a computer program stored on the memory and executed by the processor, and the processor executes the computer program to implement the cloud point matching method described in the first aspect.

In a fourth aspect, a storage medium is provided in the present embodiment, storing a computer program, and the program is executed by a processor to implement the cloud point matching method described in the first aspect.

Details of one or more embodiments of the present disclosure are set forth in the following accompanying drawings and descriptions. Other features, objectives, and advantages of the present disclosure will become obvious with reference to the specification, the accompanying drawings, and the claims.

BRIEF DESCRIPTION OF THE DRAWINGS

In order to more clearly illustrate the technical solutions in embodiments of the present disclosure or the conventional art, the accompanying drawings used in the description of the embodiments or the conventional art will be briefly introduced below. It is apparent that, the accompanying drawings in the following description are only some embodiments of the present disclosure, and other drawings can be obtained by those of ordinary skill in the art from the provided drawings without creative efforts.

FIG. 1 is a structural block diagram of hardware of a terminal of a point cloud matching method according to some embodiments.

FIG. 2 is a flowchart of a point cloud matching method according to some embodiments.

DETAILED DESCRIPTION OF THE EMBODIMENT

Figure 3:
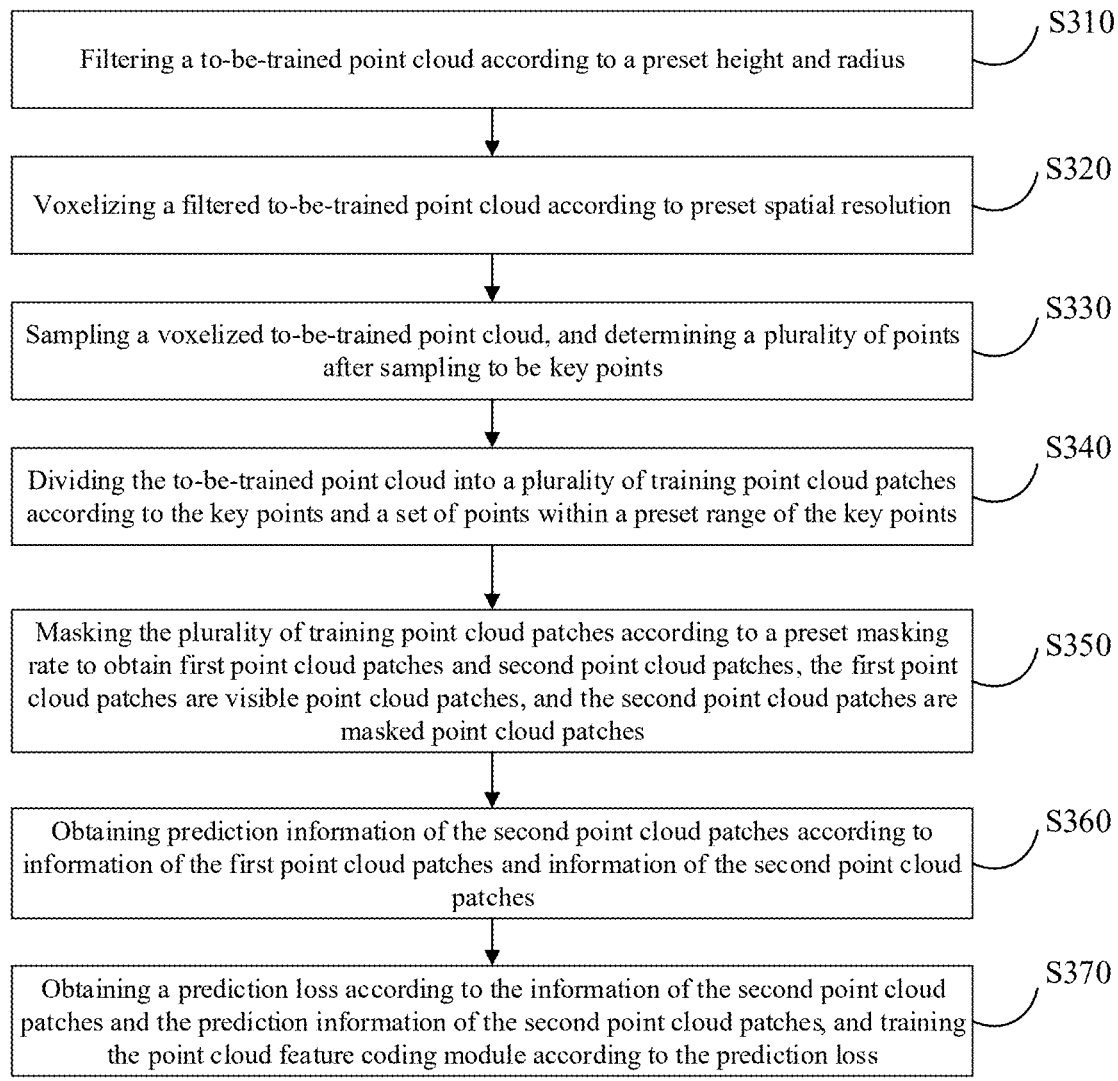
FIG. 3 is a flowchart of a pre-training method according to some embodiments.

The technical solutions in the embodiments of the present disclosure will be described clearly and completely below with reference to the accompanying drawings in the embodiments of the present disclosure. Apparently, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Unless defined otherwise, all technical and scientific terms as referred to in the present disclosure have the same meanings as would generally understood by those skilled in the technical field of the present disclosure. In the present disclosure, "a/an", "one", "the", "these", and other similar words do not indicate a quantitative limitation, which may be singular or plural. The terms such as "comprise", "include", "have", and any variants thereof as referred to in the present disclosure are intended to cover a non-exclusive inclusion, for example, processes, methods, systems, products, or devices including a series of steps or modules (units) are not limited to these steps or modules (units) listed, and may include other steps or modules (units) not listed, or may include other steps or modules (units) inherent to these processes, methods, systems, products, or devices. Words such as "connect", "join", and "couple" as referred to in the present disclosure are not limited to physical or mechanical connections, but may include electrical connections, whether direct or indirect. "A plurality of" as referred to in the present disclosure means two or more. "And/or" describes an association relationship between associated objects, indicating that three relationships may exist. For example, A and/or B indicates that there are three cases of A alone, A and B together, and B alone. Generally, the character "/" indicates an "or" relationship between the associated objects. The terms "first", "second", "third", and the like as referred to in the present disclosure only distinguish similar objects and do not represent specific ordering of the objects.

Method embodiments provided in the present embodiment may be performed in a terminal, a computer, or a similar computing apparatus. For example, the method is executed in a terminal. FIG. 1 is a structural block diagram of hardware of a terminal of a point cloud matching method in the present embodiment. Referring to FIG. 1, the terminal may include one or more (only one is shown in FIG. 1) processors 102 and a memory 104 for storing data. The processor 102 may include, but is not limited to, processing apparatuses such as a Microcontroller Unit (MCU) and a Field Programmable Gate Array (FPGA). The above terminal may further include a transmission device 106 for a communication function and an input and output device 108. One skilled in the art should understand that the structure shown in FIG. 1 is only schematic and not intended to limit the structure of the terminal. For example, the terminal may alternatively include more or fewer components than those shown in FIG. 1, or has a configuration different from that in FIG. 1.

The memory 104 may be configured to store a computer program, for example, a software program and module of application software, such as a computer program corresponding to the point cloud matching method in the present embodiment. The processor 102 may run the computer program stored in the memory 104, thereby executing various functional applications and data processing, namely, implementing the above method. The memory 104 may include a high-speed random-access memory and may also include a non-volatile memory, for example, one or more magnetic storage apparatuses, flash memories, or other non-volatile solid-state memories. In some embodiments, the memory 104 may further include memories remotely arranged relative to the processor 102, and these remote memories may be connected to the terminal over a network. Examples of the networks include, but are not limited to, the Internet, the Intranet, a local area network, a mobile communication network, and a combination thereof.

The transmission device 106 is configured to receive or send data over a network. The network includes a wireless network provided by a communication provider of the terminal. In an embodiment, the transmission device 106 includes a Network Interface Controller (NIC), which may be connected with other network devices by a base station, thereby communicating with the Internet. In an example, the transmission device 106 may be a Radio Frequency (RF) module, which is configured to communicate with the Internet in a wireless manner.

In the present embodiment, a point cloud matching method is provided. The point cloud matching method as referred to in the present disclosure is applicable to aspects such as robot navigation, three-dimensional reconstruction, industrial manufacturing, aerospace, and intelligent transportation. FIG. 2 is a flowchart of the point cloud matching method in the present embodiment. Referring to FIG. 2, a process includes step 210 to step 220 as follows.

Step 210 includes dividing a to-be-matched point cloud into a plurality of matched point cloud patches, and inputting the plurality of matched point cloud patches to a pre-trained point cloud feature coding module to obtain feature vectors of the plurality of matched point cloud patches; and during pre-training of the point cloud feature coding module, to-be-trained training point cloud patches after being masked according to a preset masking rate being input into the point cloud feature coding module, and feature vectors of visible point cloud patches and feature vectors of masked point cloud patches being output from the point cloud feature coding module respectively to train the point cloud feature coding module.

Specifically, a processor may receive a frame of to-be-matched original point cloud, divide the to-be-matched point cloud into a plurality of matched point cloud patches, and input the matched point cloud patches to the pre-trained point cloud feature coding module to obtain feature vectors of the plurality of matched point cloud patches. During the pre-training of the point cloud feature coding module, the to-be-trained training point cloud patches after being masked according to the preset masking rate are inputted, and the feature vectors of the visible point cloud patches and the feature vectors of the masked point cloud patches are outputted, respectively, so that the point cloud feature coding module can be trained later based on the feature vectors of the visible point cloud patches and the feature vectors of the masked point cloud patches. During the pre-training, the training point cloud patches input to the point cloud feature coding module are partially masked, and the point cloud feature coding module is trained according to the feature vectors of the visible point cloud patches and the feature vectors of the masked point cloud patches output, so as to improve accuracy of the feature vectors of the plurality of matched point cloud patches output by the point cloud feature coding module. Specifically, the point cloud feature coding module may include an encoder or a neural network.

Step 220 include acquiring a global description vector of the to-be-matched point cloud according to the feature vectors of the plurality of matched point cloud patches, matching the global description vector of the to-be-matched point cloud with global description vectors of point cloud frames in a preset historical database, and determining a point cloud frame in the historical database within a preset matching threshold range to be a point cloud matching result.

Specifically, the processor may obtain the global description vector of the to-be-matched point cloud according to the feature vectors of the plurality of matched point cloud patches output by the point cloud feature coding module, match the global description vector of the to-be-matched point cloud with the global description vectors of the point cloud frames in the preset historical database, and determine the point cloud frame in the historical database within the preset matching threshold range to be the point cloud matching result.

By step 210 to step 220 above, the processor may receive a frame of to-be-matched original point cloud, divide the to-be-matched point cloud into a plurality of matched point cloud patches, and input the matched point cloud patches to the pre-trained point cloud feature coding module to obtain feature vectors of the plurality of matched point cloud patches. During the pre-training of the point cloud feature coding module, the to-be-trained training point cloud patches after being masked according to the preset masking rate are input, and the feature vectors of the visible point cloud patches and the feature vectors of the masked point cloud patches are output, respectively, so that the point cloud feature coding module can be trained later based on the feature vectors of the visible point cloud patches and the masked point cloud patches. The global description vector of the to-be-matched point cloud is obtained according to the feature vectors of the plurality of matched point cloud patches output by the point cloud feature coding module. The global description vector of the to-be-matched point cloud is matched with the global description vectors of the point cloud frames in the preset historical database, and the point cloud frame in the historical database within the preset matching threshold range is determined to be the point cloud matching result. Therefore, the problem of low accuracy of matching of a point cloud matching technology based on supervised deep learning may be solved. During the pre-training, the training point cloud patches input to the point cloud feature coding module are partially masked, and the point cloud feature coding module is trained according to the feature vectors of the visible point cloud patches and the feature vectors of the masked point cloud patches output, which facilitates improving accuracy of the feature vectors of the plurality of matched point cloud patches output by the point cloud feature coding module. The global description vector of the to-be-matched point cloud is acquired according to the feature vectors of the plurality of matched point cloud patches, the global description vector of the to-be-matched point cloud is matched with the global description vectors of the point cloud frames in the preset historical database, and the point cloud frame in the historical database within the preset matching threshold range obtained by matching is determined to be the point cloud matching result, which further facilitates improving accuracy of the point cloud matching result.

In some embodiments, step 210 may include step 211 to step 214.

Step 211 may include filtering the to-be-matched point cloud according to a preset height and radius.

Specifically, the processor may filter the to-be-matched point cloud according to preset height and radius range thresholds.

Step 212 may include voxelizing a filtered to-be-matched point cloud according to preset spatial resolution.

Specifically, the processor may voxelize the filtered to-be-matched point cloud according to the preset spatial resolution. The voxelizing may be a process of converting a geometric representation of the filtered to-be-matched point cloud into the closest voxel representation of the filtered to-be-matched point cloud. The voxelization may facilitate filtering data of the to-be-matched point cloud and maintaining integrity of the to-be-matched point cloud.

Step 213 may include sampling a voxelized to-be-matched point cloud, and determining a plurality of points after sampling to be key points.

Specifically, the processor may acquire the voxelized to-be-matched point cloud, sample the voxelized to-be-matched point cloud, and take the plurality of points after sampling as key points of the to-be-matched point cloud.

Step 214 may include dividing the to-be-matched point cloud into the plurality of matched point cloud patches according to the key points and a set of points within a preset range of the key points.

Specifically, the processor may divide the to-be-matched point cloud into the plurality of matched point cloud patches according to the key points obtained by sampling and the set of points within the preset range of the key points. Each matched point cloud patch may include a key point and a set of points within a preset range of the key point.

By step 211 to step 214 above, the processor may filter the to-be-matched point cloud according to the preset height and radius range thresholds, voxelize the filtered to-be-matched point cloud according to the preset spatial resolution, then sample processed to-be-matched point cloud, take the plurality of points obtained after sampling as the key points of the to-be-matched point cloud, and divide the to-be-matched point cloud into the plurality of matched point cloud patches according to the key points obtained by sampling and the set of points within the preset range of the key points. The voxelization on the filtered to-be-matched point cloud may facilitate filtering data of the to-be-matched point cloud and maintaining integrity of the to-be-matched point cloud. The to-be-matched point cloud is divided into the plurality of matched point cloud patches, which may facilitate processing the plurality of matched point cloud patches subsequently and further facilitate improving accuracy of point cloud matching.

In some embodiments, step 210 may include step 215 to step 216.

Step 215 may include inputting the plurality of matched point cloud patches to a preset linear dimension raising layer to acquire matched point cloud patches dimension-raised to a preset dimension.

Specifically, the processor may divide the to-be-matched point cloud into the plurality of matched point cloud patches, and then input the plurality of matched point cloud patches to the pre-trained point cloud feature coding module. That is, the plurality of matched point cloud patches may be first input to the preset linear dimension raising layer to raise dimensions of the matched point cloud patches to the preset dimension.

Step 216 may include inputting the matched point cloud patches dimension-raised to the preset dimension to a preset first self-attention layer to obtain the feature vectors of the plurality of matched point cloud patches.

Specifically, the processor may dimension-raise the plurality of matched point cloud patches, and then input the plurality of matched point cloud patches dimension-raised to the preset first self-attention layer, so as to obtain the feature vectors of the plurality of matched point cloud patches.

By step 215 to step 216 above, the processor may divide the to-be-matched point cloud into the plurality of matched point cloud patches, and then input the plurality of matched point cloud patches to the pre-trained point cloud feature coding module. That is, the plurality of matched point cloud patches may be first input to the preset linear dimension raising layer to raise dimensions of the matched point cloud patches to the preset dimension. Then, the plurality of matched point cloud patches dimension-raised may be input to the preset first self-attention layer, so as to obtain the feature vectors of the plurality of matched point cloud patches. The inputting of the plurality of matched point cloud patches to the pre-trained point cloud feature coding module may facilitate improving accuracy of acquisition of the feature vectors of the plurality of matched point cloud patches.

In some embodiments, step 220 may include step 221 to step 222.

Step 221 may include acquiring a plurality of distance vectors from a preset vector library, and the distance vectors are vectors whose distances from the feature vectors of the plurality of matched point cloud patches are within a preset distance threshold range.

Specifically, the processor may acquire a plurality of vectors, whose distances from the feature vectors of the plurality of matched point cloud patches are within a preset distance threshold range, from a preset vector library, which are the distance vectors.

Step 222 may include splicing the feature vectors of the plurality of matched point cloud patches with the plurality of distance vectors to obtain the global description vector of the to-be-matched point cloud.

Specifically, the processor may splice the feature vectors of the plurality of matched point cloud patches with the plurality of distance vectors to obtain the global description vector of the to-be-matched point cloud.

By step 221 to step 222 above, the processor may acquire a plurality of vectors, whose distances from the feature vectors of the plurality of matched point cloud patches are within a preset distance threshold range, from the preset vector library. The vectors whose distances from the feature vectors of the plurality of matched point cloud patches are within the preset distance threshold range are the distance vectors. Then, the processor may splice the feature vectors of the plurality of matched point cloud patches with the plurality of distance vectors to obtain the global description vector of the to-be-matched point cloud. The distance vectors may be acquired, and the feature vectors of the plurality of matched point cloud patches may be spliced with the plurality of distance vectors to obtain the global description vector of the to-be-matched point cloud, which facilitates further improving accuracy of matching of the to-be-matched point cloud.

In the present embodiment, a method for pre-training the point cloud feature coding module is further provided. FIG. 3 is a flowchart of a pre-training method in the present embodiment. Referring to FIG. 3, the process may include step 310 to step 370 as follows.

Step 310 may include filtering a to-be-trained point cloud according to a preset height and radius.

Specifically, the processor may filter the to-be-trained point cloud according to preset height and radius range thresholds.

Step 320 may include voxelizing a filtered to-be-trained point cloud according to preset spatial resolution.

Specifically, the processor may voxelize the filtered to-be-matched point cloud according to the preset spatial resolution. The voxelization may facilitate filtering data of the to-be-trained point cloud and maintaining integrity of the to-be-trained point cloud.

Step 330 may include sampling a voxelized to-be-trained point cloud, and determining a plurality of points after sampling to be key points.

Specifically, the processor may acquire the voxelized to-be-trained point cloud, sample the to-be-trained point cloud, and take the plurality of points after sampling as key points of the to-be-trained point cloud.

Step 340 may include dividing the to-be-trained point cloud into a plurality of training point cloud patches according to the key points and a set of points within a preset range of the key points.

Specifically, the processor may divide the to-be-trained point cloud into the plurality of training point cloud patches according to the key points obtained by sampling and the set of points within the preset range of the key points. Each training point cloud patch may include a key point and a set of points within a preset range of the key point.

Step 350 may include masking the plurality of training point cloud patches according to a preset masking rate to obtain first point cloud patches and second point cloud patches, the first point cloud patches are visible point cloud patches, and the second point cloud patches are masked point cloud patches.

Specifically, the processor may mask the plurality of training point cloud patches according to the preset masking rate to obtain visible point cloud patches and masked point cloud patches, which are first point cloud patches and second point cloud patches, respectively.

Step 360 may include obtaining prediction information of the second point cloud patches according to information of the first point cloud patches and information of the second point cloud patches.

Specifically, the processor may divide a plurality of point cloud patches into a plurality of first point cloud patches and a plurality of second point cloud patches, then acquire information of the first point cloud patches and part of information of the second point cloud patches, and predict other information of the second point cloud patches according to information of the first point cloud patches and part of information of the second point cloud patches.

Step 370 may include obtaining a prediction loss according to the information of the second point cloud patches and the prediction information of the second point cloud patches, and training the point cloud feature coding module according to the prediction loss.

Specifically, the processor may calculate the prediction loss according to the information of the second point cloud patches and the prediction information of the second point cloud patches, and train the point cloud feature coding module according to the obtained prediction loss.

By step 310 to step 370 above, the processor may filter the to-be-trained point cloud according to preset height and radius range thresholds, voxelize the filtered to-be-trained point cloud according to the preset spatial resolution, then sample the processed to-be-trained point cloud, take the plurality of points after sampling as the key points of the to-be-trained point cloud, and divide the to-be-trained point cloud into the plurality of training point cloud patches according to the key points obtained by sampling and the set of points within the preset range of the key points. The processor may mask the plurality of training point cloud patches according to the preset masking rate to obtain visible point cloud patches and masked point cloud patches, which are the first point cloud patches and the second point cloud patches, respectively. The processor may divide the plurality of training point cloud patches into a plurality of first point cloud patches and a plurality of second point cloud patches, then acquire information of the first point cloud patches and part of information of the second point cloud patches, and predict other information of the second point cloud patches according to information of the first point cloud patches and part of information of the second point cloud patches. The processor may calculate the prediction loss according to the information of the second point cloud patches and the prediction information of the second point cloud patches, and train the point cloud feature coding module according to the obtained prediction loss. The voxelization on the filtered to-be-trained point cloud may facilitate filtering data of the to-be-trained point cloud and maintaining integrity of the to-be-trained point cloud. The to-be-trained point cloud may be divided into the plurality of training point cloud patches, which facilitates processing the plurality of training point cloud patches subsequently and further facilitate improving accuracy of point cloud matching. The plurality of training point cloud patches may be divided into the first point cloud patches and the second point cloud patches according to the preset masking rate, other information of the second point cloud patches may be predicted according to information of the first point cloud patches and the second point cloud patches, the prediction loss of the second point cloud patches may be calculated, and the point cloud feature coding module may be trained by the prediction loss, which facilitates better training the point cloud feature coding module, thereby improving accuracy of the feature vectors output by the point cloud feature coding module.

In some embodiments, step 360 may include step 361 to step 366.

Step 361 may include inputting coordinates of key points in the first point cloud patches to a preset visible position coding layer to obtain position code of the first point cloud patches.

Specifically, the processor may input the coordinates of the key points in the first point cloud patches to the preset visible position coding layer to obtain relevant position code of the first point cloud patches. The coordinates of the key points may be coordinates of central points.

Step 362 may include inputting coordinates of key points in the second point cloud patches to a preset mask position coding layer to obtain position code of the second point cloud patches.

Specifically, the processor may input the coordinates of the key points in the second point cloud patches to the preset mask position coding layer to obtain relevant position code of the second point cloud patches.

Step 363 may include inputting the first point cloud patches and the second point cloud patches to a preset linear dimension raising layer to obtain first point cloud patches and second point cloud patches dimension-raised to a preset dimension.

Specifically, the processor may input the first point cloud patches and the second point cloud patches to the preset linear dimension raising layer to obtain the first point cloud patches and the second point cloud patches dimension-raised. The arrangement of the linear dimension raising layer may facilitate improving accuracy of the feature vectors output by the point cloud position coding module.

Step 364 may include inputting the first point cloud patches and the second point cloud patches dimension-raised to the preset dimension to a preset first self-attention layer to obtain the feature vectors of the first point cloud patches and the feature vectors of the second point cloud patches, respectively.

Specifically, the processor may input the first point cloud patches and the second point cloud patches dimension-raised to the preset first self-attention layer, respectively, to obtain the feature vectors of the first point cloud patches and the feature vectors of the second point cloud patches, respectively.

Step 365 may include adding the feature vectors of the first point cloud patches and the position code of the first point cloud patches, and splicing an addition result with the position code of the second point cloud patches to obtain a tensor of the to-be-trained point cloud.

Specifically, the processor may add the feature vectors of the first point cloud patches and the position code of the first point cloud patches, and splice the addition result with the position code of the second point cloud patches to obtain the tensor of the to-be-trained point cloud. This facilitates improving accuracy of subsequent prediction of other information of the second point cloud patches.

Step 366 may include inputting the tensor of the to-be-trained point cloud to a preset second self-attention layer to obtain predicted feature vectors of the second point cloud patches, and the predicted feature vectors are the prediction information.

Specifically, the processor may input the tensor of the to-be-trained point cloud to the preset second self-attention layer to obtain the predicted feature vectors of the second point cloud patches.

By step 361 to step 366 above, the processor may input the coordinates of the key points in the first point cloud patches to the preset visible position coding layer to obtain relevant position code of the first point cloud patches. The coordinates of the key points may be coordinates of central points. The processor may input the coordinates of the key points in the second point cloud patches to the preset mask position coding layer to obtain relevant position code of the second point cloud patches. The processor may input the first point cloud patches and the second point cloud patches to the preset linear dimension raising layer to obtain first point cloud patches and second point cloud patches dimension-raised. Then, the processor may input the first point cloud patches and the second point cloud patches dimension-raised to the preset first self-attention layer, respectively, to obtain the feature vectors of the first point cloud patches and the feature vectors of the second point cloud patches, respectively, add the feature vectors of the first point cloud patches and the position code of the first point cloud patches, and splice the addition result with the position code of the second point cloud patches to obtain the tensor of the to-be-trained point cloud. The processor may input the tensor of the to-be-trained point cloud to the preset second self-attention layer to obtain the predicted feature vectors of the second point cloud patches. The arrangement of the linear dimension raising layer may facilitate improving accuracy of the feature vectors output by the point cloud position coding module. The feature vectors and the position code of the first point cloud patches are added and then spliced with the position code of the second point cloud patches, which may facilitate improving accuracy of subsequent prediction of other information of the second point cloud patches and further improving the accuracy of the feature vectors output by the point cloud feature coding module.

In some embodiments, step 370 may include step 371 to step 376.

Step 371 may include acquiring a plurality of original vectors in the predicted feature vectors of the second point cloud patches and feature vectors of the second point cloud patches, acquiring replacement vectors corresponding to the plurality of original vectors from a preset vector library, and replacing the plurality of original vectors with the replacement vectors.

Specifically, the processor may acquire the plurality of original vectors in the predicted feature vectors of the second point cloud patches and the feature vectors of the second point cloud patches, acquire the replacement vectors corresponding to the plurality of original vectors from the preset vector library, and then replace the plurality of original vectors with the replacement vectors.

Step 372 may include determining feature vectors and predicted feature vectors of the second point cloud patches after replacing to be semantics of the second point cloud patches and predicted semantics of the second point cloud patches, respectively.

Specifically, the processor may determine the feature vectors and predicted feature vectors of the second point cloud patches after replacing to be the semantics of the second point cloud patches and the predicted semantics of the second point cloud patches, respectively.

Step 373 may include calculating a squared error between the semantics of the second point cloud patches and the predicted semantics of the second point cloud patches, and the squared error is a first prediction loss.

Specifically, the processor may calculate the first prediction loss, i.e., the squared error between the semantics of the second point cloud patches and the predicted semantics of the second point cloud patches. The squared error is the first prediction loss.

Step 374 may include inputting the feature vectors of the second point cloud patches to a preset third self-attention layer and a linear dimension reducing layer to obtain predicted coordinates of each point in the second point cloud patches after dimension reduction.

Specifically, the processor may sequentially input the feature vectors of the second point cloud patches to the preset third self-attention layer and the linear dimension reducing layer to obtain the predicted coordinates of each point in the second point cloud patches after dimension reduction.

Step 375 may include calculating a chamfer distance between coordinates of the second point cloud patches and predicted coordinates of the second point cloud patches, and the chamfer distance is a second prediction loss.

Specifically, the processor may calculate the chamfer distance between the coordinates of the second point cloud patches and the predicted coordinates of the second point cloud patches, and determine the chamfer distance to be the second prediction loss.

Step 376 may include determining a sum of the first prediction loss and the second prediction loss to be the prediction loss.

Specifically, the processor may take the sum of the first prediction loss and the second prediction loss as the prediction loss, to use the prediction loss to train the point cloud feature coding module.

By step 371 to step 376 above, the processor may acquire the plurality of original vectors in the predicted feature vectors of the second point cloud patches and the feature vectors of the second point cloud patches, acquire the replacement vectors corresponding to the plurality of original vectors from the preset vector library, and then replace the plurality of original vectors with the replacement vectors. The processor may determine the feature vectors and predicted feature vectors of the second point cloud patches after replacing to be semantics of the second point cloud patches and predicted semantics of the second point cloud patches, respectively. The processor may calculate the first prediction loss by the semantics and the predicted semantics of the second point cloud patches, that is, the squared error between the semantics of the second point cloud patches and the predicted semantics of the second point cloud patches. Then, the processor may sequentially input the feature vectors of the second point cloud patches to the preset third self-attention layer and the linear dimension reducing layer to obtain the predicted coordinates of each point in the second point cloud patches after dimension reduction. The processor may calculate the chamfer distance between the coordinates of the second point cloud patches and the predicted coordinates of the second point cloud patches, and determine the chamfer distance to be the second prediction loss. The processor may take the sum of the first prediction loss and the second prediction loss as the prediction loss, to use the prediction loss to train the point cloud feature coding module. A semantic alignment error of the second point cloud patches and a predicted chamfer distance of the second point cloud patches may be acquired as the prediction loss, and the point cloud feature coding module may be trained according to the prediction loss, which facilitates further improving accuracy of training, thereby improving accuracy of the feature vectors output by the point cloud feature coding module and improving accuracy of point cloud matching.

The present embodiment may be described and illustrated below by alternative embodiments.

Figure 4:
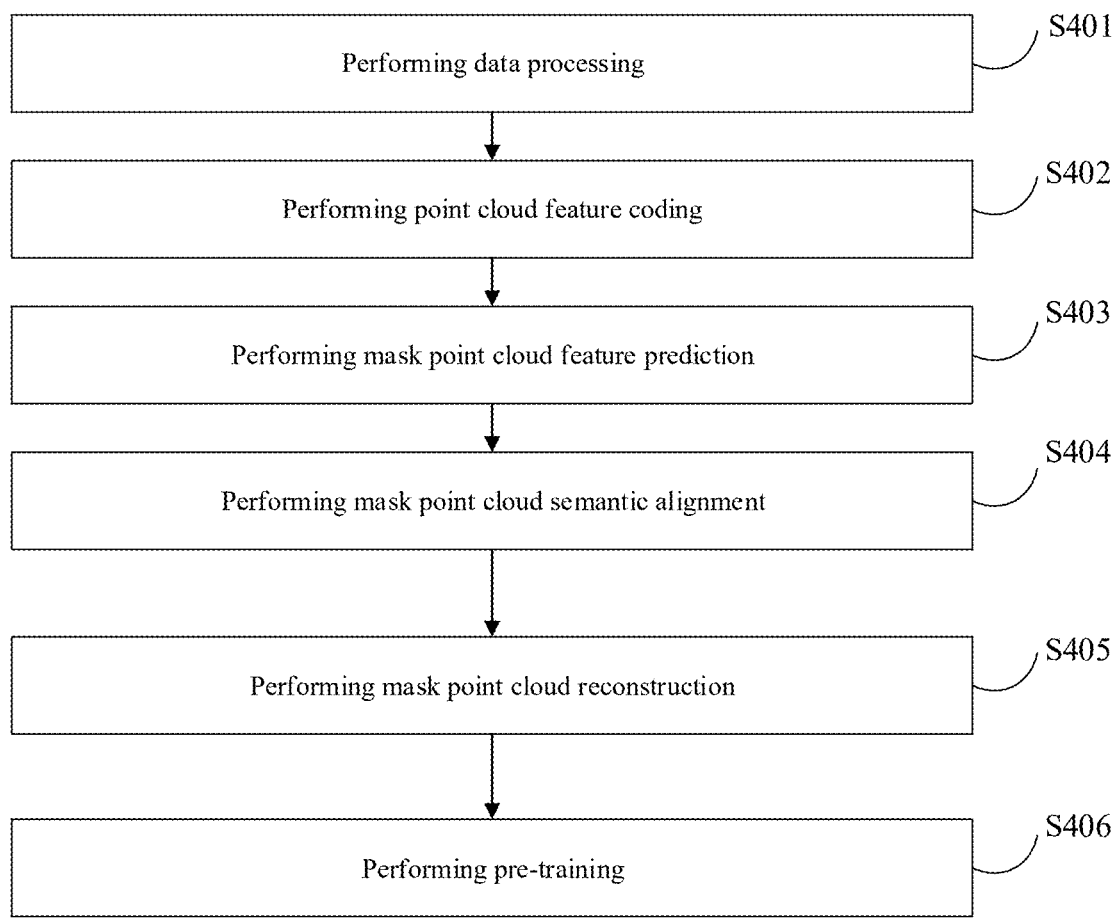
FIG. 4 is an alternative flowchart of a pre-training method according to some embodiments.

FIG. 4 is an alternative flowchart of a pre-training method in the present embodiment. Referring to FIG. 4, the pre-training method may include the following step 401 to step 406.

Step 401 may include performing data processing.

Specifically, a single point cloud frame and a masking rate may be input, and visible point cloud patches and masked point cloud patches may be output. The single point cloud frame and the masking rate denoted as R may be input to a module corresponding to the data processing, i.e., a data processing module. The data processing module may filter a point cloud according to preset height and radius range thresholds, voxelize a filtered point cloud according to preset spatial resolution, then sample G key points from a voxelized point cloud, and select K points closest to each key point as a neighborhood thereof to obtain G training point cloud patches. A set of one key point and a neighborhood thereof may be a training point cloud patch. Values of G and K may be preset values. G training point cloud patches may be randomly masked according to the preset masking rate R, and a total of G*R point cloud patches are masked. In particular, G*R is not an integer, it is rounded down. Therefore, the data processing module may output G*(1−R) visible point cloud patches denoted as $X_V$ and G*R masked point cloud patches denoted as $X_M$. Sizes of the visible point cloud patches and the masked point cloud patches are G*(1−R)*N and G*R*N, respectively, and N may represent a coordinate dimension of a point in a three-dimensional space.

Exemplarily, a frame of original point cloud may be input to the data processing module, and points with heights ranging from −20 cm to 200 cm and within a radius range of 30 m may be selected as filtered points. The filtered point cloud may be voxelized, and a to-be-trained point cloud after voxelization may be sampled. Further specifically, 128 key points may be sampled from the voxelized to-be-trained point cloud by Farthest Point Sampling (FPS). 64 points closest to each key point may be selected as a neighborhood thereof. The number of point clouds in each frame may be controlled to be 4096, and this point cloud frame may be named as F. Therefore, 128 training point cloud patches can be obtained. A preset masking rate R may be determined as 0.75. Therefore, 96 training point cloud patches may be required to randomly select for masking. A method for selecting masked point cloud patches may be as follows: performing simple random sampling, stratified sampling, and the like, and finally outputting 32 visible point cloud patches $X_V$ and 96 masked point cloud patches $X_M$. Sizes of the two types of training point cloud patches may be 32*3 and 96*3, respectively, and 3 may represent a coordinate dimension of a point in the three-dimensional space.

Step 402 may include performing point cloud feature coding.

Specifically, the visible point cloud patches $X_V$ and the masked point cloud patches $X_M$ may be input to a module corresponding to the point cloud feature coding, i.e., a point cloud feature coding module. The point cloud feature coding module may output visible point cloud patch features and masked point cloud patch features. A first layer of the point cloud feature coding module may be a linear layer, which is configured to raise a dimension of the to-be-trained point cloud. That is, training point cloud patches with sizes of G*(1−R)*N and G*R*N may be dimension-raised to point cloud patches with sizes of G*(1−R)*C and G*R*C, the value of N may be less than the value of C, and the value of C is a predefined value. The point cloud feature coding module may include DE self-attention layers from a second layer, and DE represents the number of the self-attention layers. The visible point cloud patches and the masked point cloud patches may be input to the point cloud feature coding module separately. The visible point cloud patches may be input to the point cloud feature coding module, and visible point cloud patches features denoted as $F_V$ may be output. The masked point cloud patches may be input to the point cloud feature coding module, and masked point cloud patch features $F_M$ denoted as may be outputted.

Exemplarily, the first layer of the point cloud feature coding module may be a linear layer, which is configured to raise the dimension of the to-be-trained point cloud. Specifically, the value of C may be 256. That is, training point cloud patches with sizes of 32*3 and 96*3 may be dimension-raised to training point cloud patches with sizes of 32*256 and 96*256, respectively. The second layer of the point cloud feature coding module may include 12 self-attention layers. Visible point cloud patches $X_V$ with a size of 32*256 may be input to the 12 self-attention layers, and visible point cloud patch features denoted as $F_V$ may be output. Masked point cloud patches $X_M$ with a size of 96*256 may be input to the 12 self-attention layers, and masked point cloud patch features denoted as $F_M$ may be output.

Step 403 may include performing mask point cloud feature prediction.

Specifically, the visible point cloud patch features, a coordinate of a visible point cloud patch center, and a coordinate of a masked point cloud patch center may be input to a module corresponding to the mask point cloud feature prediction, i.e., a mask point cloud feature prediction module, and predicted masked point cloud patch features may be output. The mask point cloud feature prediction module may include DP self-attention layers, and DP represents the number of the self-attention layers. The coordinate of the masked point cloud patch center and a size of the masked point cloud patches denoted as G*R*N may be input to a masked position coding layer to obtain position code of the masked point cloud patches with a size of G*R*C. The coordinate of the visible point cloud patch center and a size of the visible point cloud patches denoted as G*(1−R)*N may be input to a visible position coding layer to obtain position code of the visible point cloud patches with a size of G*(1−R)*C. The visible point cloud patch features $F_V$ and the position code of the visible point cloud patches may be added, the size may be still G*(1−R)*C, the addition result may be spliced with the position code of the masked point cloud patches to obtain a tensor denoted as $E_P$ with a size of G*C, and the tensor $E_P$ may be input to the mask point cloud feature prediction module. After the tensor $E_P$ passes through the DP self-attention layers, a predicted feature denoted as $F_P$ may be obtained, and results corresponding to positions of the masked point cloud patches in the $F_P$ may be taken as predicted masked point cloud patch features denoted as $F_{PM}$.

Exemplarily, the coordinate of the masked point cloud patch center may be input to the masked position coding layer to obtain position code of masked point cloud patches with a size of 96*256, and a size of the masked point cloud patch inputted may be 96*3. The coordinate of the visible point cloud patch center may be input to the visible position coding layer to obtain position code of the visible point cloud patches with a size of 32*256, and a size of the visible point cloud patches input may be 32*3. The visible point cloud patch features $F_V$ and the position code of the visible point cloud patches may be added, the size may be still 32*256, the addition result may be spliced with the position code of the masked point cloud patches to obtain a tensor $E_P$ with a size of 128*256, and the $E_P$ may be input to the mask point cloud feature prediction module. The mask point cloud feature prediction module may include 4 self-attention layers. After the $E_P$ passes through the 4 self-attention layers, a predicted feature $F_P$ may be obtained, and results corresponding to the position of the masked point cloud patches in the $F_P$ may be taken as predicted masked point cloud patch features $F_{PM}$.

Step 404 may include performing mask point cloud semantic alignment.

Specifically, the masked point cloud patch features $F_M$ and the predicted masked point cloud patch features $F_{PM}$ may be input to a module corresponding to the mask point cloud semantic alignment, i.e., a mask point cloud semantic alignment module, and masked point cloud patch semantics denoted as $S_M$ and predicted masked point cloud patch semantics denoted as $S_{PM}$ may be output, respectively. A point cloud term vector library (PCV) may be pre-built. The point cloud term vector library may include A vectors with a size of 1*C, a value of A may be preset, and vector values may be obtained by training. For vectors denoted as f in $F_M$ and $F_{PM}$, the PCV may be searched for vectors denoted as v closest to vectors f, and vectors f may be replaced with the vectors v, thereby obtaining masked point cloud patch semantics $S_M$ and predicted masked point cloud patch semantics $S_{PM}$. Searching the closest vectors to the vectors f is measuring a distance between vectors f and the closest vectors which is determined by a squared error. A squared error between $S_M$ and $S_{PM}$ may be calculated as a masked point cloud semantic alignment error.

Exemplarily, a point cloud term vector library including 1024 vectors with a size of 1*256 may be pre-built. The PCV may be searched for a vector v closest to each vector f in $F_M$ and $F_{PM}$, and the vectors f in $F_M$ and $F_{PM}$ may be replaced with the vectors v, thereby obtaining masked point cloud patch semantics $S_M$ and predicted masked point cloud patch semantics $S_{PM}$, respectively. A squared error between $S_M$ and $S_{PM}$ may be calculated as a masked point cloud semantic alignment error. A formula of the masked point cloud semantic alignment error may be:

$$L_{voc} = \|S_M - S_{PM}\|^2$$

$L_{voc}$ represents the masked point cloud semantic alignment error, $S_M$ represents the masked point cloud patch semantics, $S_{PM}$ represents the predicted masked point cloud patch semantics, and 2 represents square, that is, $\|S_M - S_{PM}\|^2$ represents a square of a norm of a vector difference between the masked point cloud patch semantics $S_M$ and the predicted masked point cloud patch semantics $S_{PM}$.

Step 405 may include performing mask point cloud reconstruction.

Specifically, the predicted masked point cloud patch features $F_{PM}$ may be input to a module corresponding to the mask point cloud reconstruction, i.e., a mask point cloud reconstruction module, and predicted coordinates $X_{PM}$ of each point in the masked point cloud patch may be output. The mask point cloud reconstruction module may include DD self-attention layers and a linear dimension reducing layer, and DD represents the number of the self-attention layers. After the $F_{PM}$ pass through the DD self-attention layers, output size may remain unchanged and be still G*R*C, the $F_{PM}$ passing through the DD self-attention layers may be input to the linear dimension reducing layer to obtain the predicted coordinates $X_{PM}$ of each point in the masked point cloud patch, with a size of G*R*3, and a chamfer distance between $X_M$ and $X_{PM}$ may be calculated.

Exemplarily, the mask point cloud reconstruction module may include 4 self-attention layers and a linear dimension reducing layer. After the $F_{PM}$ pass through the 4 self-attention layers, output size may remain unchanged and is 96*256, and the output may be put into the linear dimension reducing layer to obtain the predicted coordinates $X_{PM}$ of each point in the masked point cloud patch, with a size of 96*3. A formula for calculating the chamfer distance between $X_M$ and $X_{PM}$ may be:

$$L_{rec}(X_M, X_{PM}) = \frac{1}{|X_M|} \sum_{p \in X_M} \min_{q \in X_{PM}} \|p - q\|_2^2 + \frac{1}{|X_{PM}|} \sum_{q \in X_{PM}} \min_{p \in X_M} \|q - p\|_2^2$$

$L_{rec}(X_M, X_{PM})$ represents the chamfer distance between $X_M$ and $X_{PM}$, $X_M$ may include coordinates of each point in the masked point cloud patch, p represents a coordinate of a point in the masked point cloud patch, $X_{PM}$ may include predicted coordinates of each point in the masked point cloud patch, and q represents a predicted coordinate of a point in the masked point cloud patch. $\|q-p\|_2$ represents a matrix norm, i.e., a spectral norm, 2 represents that the matrix norm is 2-norm, and 2-norm represents a distance in the usual sense and represents a square root of a maximum matrix eigenvalue obtained by multiplying a (q–p) matrix by a transposed conjugate matrix of the (q–p) matrix, i.e., a maximum singular value of the (q–p) matrix. Therefore, $\|p-q\|_2^2$ re represents a square of the maximum singular value of a vector difference between the predicted coordinate q of a point in the masked point cloud patch and the coordinate p of a point in the masked point cloud patch;

$$\frac{1}{|X_M|} \sum_{p \in X_M} \min_{q \in X_{PM}} \|p - q\|_2^2$$

represents a sum of minimum distances from any point p in $X_M$ to $X_{PM}$; and $$\frac{1}{|X_{PM}|} \sum_{q \in X_{PM}} \min_{p \in X_M} \|q - p\|_2^2$$

represents a sum of minimum distances from any point q in $X_{PM}$ to $X_M$. When the calculated chamfer distance is great, it indicates that a mask point cloud reconstruction effect is poor. When the calculated chamfer distance is small, it indicates that the mask point cloud reconstruction effect is good.

Step 406 may include performing pre-training.

Specifically, a sum of the masked point cloud semantic alignment error $L_{voc}$ and the chamfer distance $L_{rec}(X_M, X_{PM})$ between $X_M$ and $X_{PM}$ may be taken as a total loss, and the point cloud feature coding module may be trained according to the total loss, to improve accuracy of the feature vectors output by the point cloud feature coding module.

Figure 5:
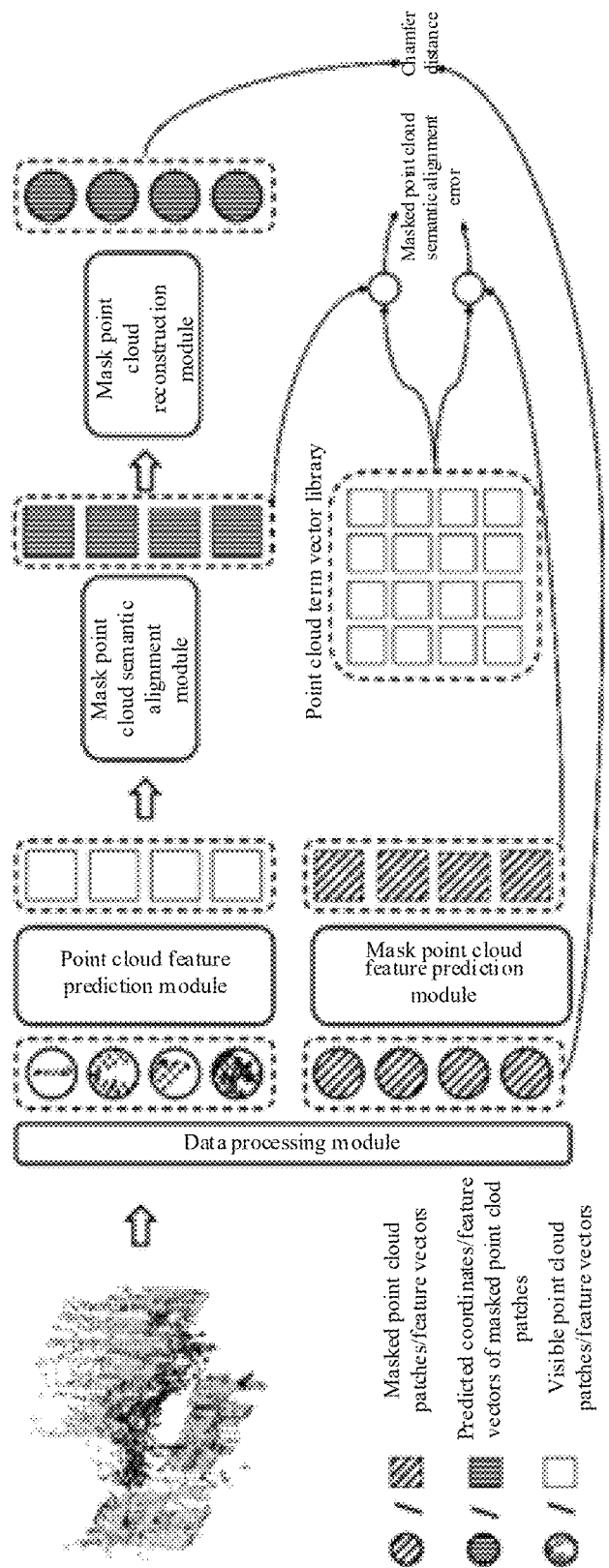
FIG. 5 is a diagram of a mask semantic modeling and a training process of an alignment method according to some embodiments.

FIG. 5 is a diagram of a mask semantic modeling and a training process of an alignment method in the present embodiment. Referring to FIG. 5, a to-be-trained point cloud may be input, the to-be-trained point cloud may pass through the foregoing data processing module, the to-be-trained point cloud may be divided into a plurality of visible point cloud patches and masked point cloud patches, the visible point cloud patches may be represented by circular images with dots in circles in FIG. 5, and the masked point cloud patches may be represented by circular images with slashes in circles. Then, the plurality of visible point cloud patches and masked point cloud patches obtained may be input to the foregoing point cloud feature coding module to obtain feature vectors of the visible point cloud patches and feature vectors of the masked point cloud patches, respectively. In FIG. 5, the feature vectors of the visible point cloud patches may be represented by solid squares, and the feature vectors of the masked point cloud patches may be represented by squares with slashes. Then, by the foregoing mask point cloud semantic alignment module and according to predicted feature vectors of the masked point cloud patches obtained, the predicted feature vectors of the masked point cloud patches may be represented by squares with vertical lines inside in FIG. 5, the point cloud term vector library PCV may be searched for a vector v closest to each vector f in $F_M$ and $F_{PM}$, the point cloud term vector library may be represented by a square set including 16 squares arranged in sequence in FIG. 5, and the vectors f in $F_M$ and $F_{PM}$ may be replaced with the vectors v, thereby obtaining the masked point cloud patch semantics $S_M$ and the predicted masked point cloud patch semantics $S_{PM}$ respectively and obtaining the masked point cloud semantic alignment error $L_{voc}$ according to $S_M$ and $S_{PM}$. Then, by the foregoing mask point cloud reconstruction module, predicted feature vectors of the masked point clod patches may be input to obtain predicted coordinates in the masked point clod patches and chamfer distances $L_{rec}$ between coordinates in the masked point clod patches and the predicted coordinates, and the predicted coordinates of the masked point clod patches may be represented by circles with vertical lines inside in FIG. 5. The above process is the mask semantic modeling and the training process of the alignment method for the point cloud feature coding module.

Figure 6:
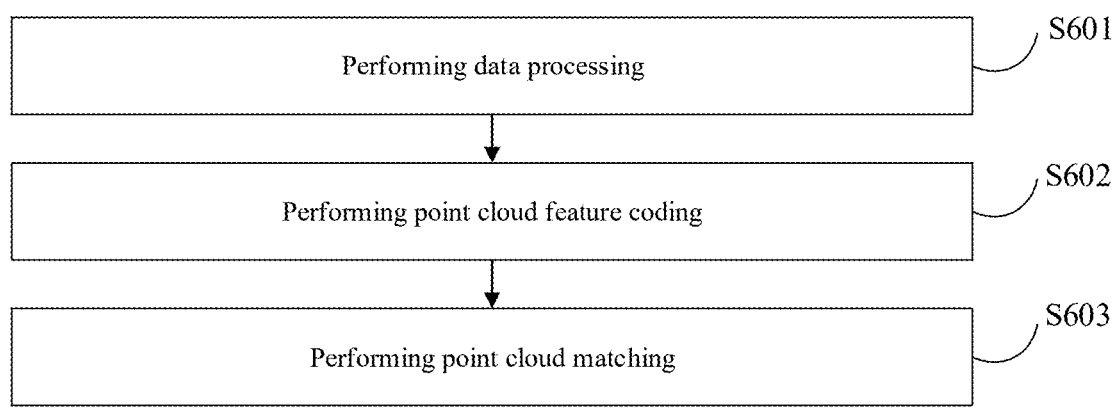
FIG. 6 is an alternative flowchart of a point cloud matching method according to some embodiments.

FIG. 6 is an alternative flowchart of a point cloud matching method in the present embodiment. Referring to FIG. 6, the point cloud matching method may include the following step 601 to step 603.

Step 601 may include performing data processing.

Specifically, a single point cloud frame may be input, and matched point cloud patches may be output. The single point cloud frame may be input to a module corresponding to the data processing, i.e., a data processing module. The data processing module may filter the point cloud frame according to preset height and radius range thresholds, voxelize a filtered point cloud frame according to preset spatial resolution, then sample G key points from a voxelized point cloud frame, and select K points closest to each key point as a neighborhood thereof to obtain G matched point cloud patches. A key point and a neighborhood thereof may be called a patch. Values of G and K may be both preset values. Therefore, the data processing module may output G matched point cloud patches. A size of each matched point cloud patch may be G*N, and N represents a coordinate dimension of a point in a three-dimensional space.

Step 602 may include performing point cloud feature coding.

Specifically, the matched point cloud patches may be input to a module corresponding to the point cloud feature coding, i.e., a point cloud feature coding module. The point cloud feature coding module may output feature vectors of the matched point cloud patches. A first layer of the point cloud feature coding module may be a linear layer, which is configured to raise a dimension of the matched point cloud. That is, training point cloud patches with a size of G*N may be dimension-raised to G*C, and the value of N is less than the value of C, and the value of C may be a predefined value. The point cloud feature coding module may include DE self-attention layers from a second layer. The matched point cloud patches may be input to the point cloud feature coding module, and feature vectors denoted as $F_{ALL}$ of all the matched point cloud patches may be output.

Step 603 may include performing point cloud matching.

Specifically, a vector feature denoted as $v_n$ of each vector in the point cloud term vector library, i.e., the PCV, may be acquired, and Vectors of Locally Aggregated Descriptors (VLADs) of the feature vectors $F_{ALL}$ of all the matched point cloud patches may be calculated. A formula of the VLADs may be:

$$G_n = \sum_{f_{all} \in F_{ALL}} a_n(f_{all} - v_n)$$

In the above formula, n represnets an n-th vector in the PCV, $F_{ALL}$ represents the feature vectors of all the matched point cloud patches, and $f_{all}$ represents a feature vector of a matched point cloud patch. Exemplarily, a value range of the feature vector of the matched point cloud patch may be 1 to 1024. When $a_n$ is equal to 1, it indicates that $v_n$ is a vector in the PCV closest to $f_{all}$. When an is equal to 0, it indicates that $v_n$ is not the vector in the PCV closest to $$\sum_{f_{all} \in F_{ALL}} a_n(f_{all} - v_n)$$

represents a set of vectors in the PCV closest to the feature vector $f_{all}$ of each matched point cloud patch in $F_{ALL}$.

Exemplarily, $G_n$ represents a vector with a length of 1*256, 1024 vectors of $G_1$ to $G_{1024}$ may be spliced into a vector with a length of 1024*256, which is a global description vector of a current to-be-matched point cloud. Then, the global description vector of the current to-be-matched point cloud may be compared with global description vectors extracted from a historical database, and a historical point cloud frame with the closest Euclidean distance to the current global description vector may be returned, which is a point cloud matching result.

It should be noted that steps shown in the above processes or the flowcharts of the accompanying drawings may be performed in a computer system such as a group of computer-executable instructions.

A point cloud matching apparatus 100 is further provided in the present embodiment. The apparatus is configured to implement the above embodiments and alternative implementations. Those that have been described will not be described again. As used below, the terms "module", "unit", "subunit", and the like may be combinations of software and/or hardware that can implement predetermined functions. The apparatus described in the following embodiments may be implemented by software, but implementation by hardware or by a combination of software and hardware is also possible and conceived.

Figure 7:
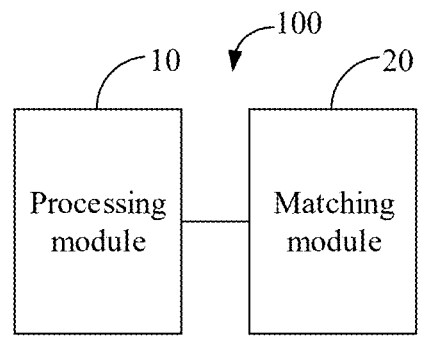
FIG. 7 is a structural block diagram of a point cloud matching apparatus according to some embodiments.

FIG. 7 is a structural block diagram of the point cloud matching apparatus 100 in the present embodiment. Referring to FIG. 7, the apparatus includes: a processing module 10 and a matching module 20.

The processing module 10 is configured to divide a to-be-matched point cloud into a plurality of matched point cloud patches, and input the plurality of matched point cloud patches to a pre-trained point cloud feature coding module to obtain feature vectors of the plurality of matched point cloud patches. During pre-training of the point cloud feature coding module, to-be-trained training point cloud patches after being masked according to a preset masking rate are input into the point cloud feature coding module, and feature vectors of visible point cloud patches and feature vectors of masked point cloud patches are output from the point cloud feature coding module, respectively.

The matching module 20 is configured to acquire a global description vector of the to-be-matched point cloud according to the feature vectors of the plurality of matched point cloud patches, match the global description vector of the to-be-matched point cloud with global description vectors of point cloud frames in a preset historical database, and determine a point cloud frame in the historical database within a preset matching threshold range to be a point cloud matching result.

It should be noted that the above modules may be functional modules or program modules, and may be implemented by software or hardware. For modules implemented by hardware, the above modules may be located in a same processor; or the above modules may alternatively be located in different processors in any combination.

An electronic apparatus 200 is further provided in the present embodiment, including a memory and a processor. The memory stores a computer program. The processor is configured to execute the computer program to perform steps in any one of the above method embodiments.

alternatively, the above electronic apparatus 200 may further include a transmission device and an input and output device. The transmission device may be connected to the above processor. The input and output device may be connected to the above processor.

Alternatively, in the present embodiment, the above processor may be configured to perform the following steps by the computer program.

Step 1 may include dividing a to-be-matched point cloud into a plurality of matched point cloud patches, and inputting the plurality of matched point cloud patches to a pre-trained point cloud feature coding module to obtain feature vectors of the plurality of matched point cloud patches. During pre-training of the point cloud feature coding module, to-be-trained training point cloud patches after being masked according to a preset masking rate are input into the point cloud feature coding module, and feature vectors of visible point cloud patches and feature vectors of masked point cloud patches are output from the point cloud feature coding module respectively to train the point cloud feature coding module.

Step 2 may include acquiring a global description vector of the to-be-matched point cloud according to the feature vectors of the plurality of matched point cloud patches, matching the global description vector of the to-be-matched point cloud with global description vectors of point cloud frames in a preset historical database, and determining a point cloud frame in the historical database within a preset matching threshold range to be a point cloud matching result.

It should be noted that specific examples in the present embodiment may be obtained with reference to the examples described in the above embodiments and alternative implementations. Details are not described again in the present embodiment.

In addition, in combination with the point cloud matching method provided in the above embodiments, a storage medium may also be provided in the present embodiment for implementation. A computer program is stored on the storage medium. When the computer program is executed by the processor, any one of the point cloud matching methods in the above embodiments is implemented.

It should be understood that specific embodiments described herein are only intended to explain this application and are not intended to limit it. According to the embodiments provided in the present disclosure, all other embodiments obtained by those skilled in the art without creative efforts fall within the protection scope of the present disclosure.

Obviously, the accompanying drawings are only some examples or embodiments of the present disclosure. For those skilled in the art, the present disclosure can also be applied to other similar situations based on these accompanying drawings without creative efforts. In addition, it may be understood that, although the work done in this development process may be complex and lengthy, for those skilled in the art, certain designs, manufacturing, production, or other changes based on the technical content disclosed in the present disclosure are only routine technical means and should not be regarded as insufficient content disclosed in the present disclosure.

The word "embodiment" in the present disclosure means that specific features, structures, or characteristics described in conjunction with the embodiments may be included in at least one embodiment of the present disclosure. Phrases appearing at various positions of the specification neither mean the same embodiment, nor mean separate or alternative embodiments that are mutually exclusive with other embodiments. It is explicitly or implicitly understood by those of ordinary skill in the art that the embodiments described in the present disclosure may be combined with other embodiments without conflict.

The above embodiments only describe several implementations of the present disclosure, which are described specifically and in detail, and therefore cannot be construed as a limitation on the protection scope of the patent. It should be pointed out that those of ordinary skill in the art may also make several changes and improvements without departing from the ideas of the present disclosure, all of which fall within the protection scope of the present disclosure. Therefore, the protection scope of the present disclosure shall be subject to the appended claims.

What is claimed is:

1. A point cloud matching method, comprising:
dividing a to-be-matched point cloud into a plurality of matched point cloud patches, and inputting the plurality of matched point cloud patches to a pre-trained point cloud feature coding module to obtain feature vectors of the plurality of matched point cloud patches, wherein during pre-training of the point cloud feature coding module, to-be-trained training point cloud patches after being masked according to a preset masking rate are input into the point cloud feature coding module, and feature vectors of visible point cloud patches and feature vectors of masked point cloud patches are output from the point cloud feature coding module respectively to train the point cloud feature coding module; and
acquiring a global description vector of the to-be-matched point cloud according to the feature vectors of the plurality of matched point cloud patches, matching the global description vector of the to-be-matched point cloud with global description vectors of point cloud frames in a preset historical database, and determining a point cloud frame in the historical database within a preset matching threshold range to be a point cloud matching result;

the dividing the to-be-matched point cloud into the plurality of matched point cloud patches further comprises:

filtering the to-be-matched point cloud according to a preset height and radius;

voxelizing a filtered to-be-matched point cloud according to preset spatial resolution;

sampling a voxelized to-be-matched point cloud, and determining a plurality of points after sampling to be key points; and dividing the to-be-matched point cloud into the plurality of matched point cloud patches according to the key points and a set of points within a preset range of the key points.

2. The point cloud matching method of claim 1, wherein the dividing the to-be-matched point cloud into the plurality of matched point cloud patches, and inputting the plurality of matched point cloud patches to the pre-trained point cloud feature coding module to obtain the feature vectors of the plurality of matched point cloud patches further comprises:

inputting the plurality of matched point cloud patches to a preset linear dimension raising layer to acquire matched point cloud patches dimension-raised to a preset dimension; and inputting the matched point cloud patches dimension-raised to the preset dimension to a preset first self-attention layer to obtain the feature vectors of the plurality of matched point cloud patches.

3. The point cloud matching method of claim 1, wherein the acquiring the global description vector of the to-be-matched point cloud according to the feature vectors of the plurality of matched point cloud patches further comprises:

acquiring a plurality of distance vectors from a preset vector library, wherein the distance vectors are vectors whose distances from the feature vectors of the plurality of matched point cloud patches are within a preset distance threshold range; and splicing the feature vectors of the plurality of matched point cloud patches with the plurality of distance vectors to obtain the global description vector of the to-be-matched point cloud.

4. The point cloud matching method of claim 1, wherein, prior to the dividing the to-be-matched point cloud into the plurality of matched point cloud patches and inputting the plurality of matched point cloud patches to the pre-trained point cloud feature coding module, the method further comprises:

filtering a to-be-trained point cloud according to a preset height and radius;

voxelizing a filtered to-be-trained point cloud according to preset spatial resolution;

sampling a voxelized to-be-trained point cloud, and determining a plurality of points after sampling to be key points;

dividing the to-be-trained point cloud into a plurality of training point cloud patches according to the key points and a set of points within a preset range of the key points;

masking the plurality of training point cloud patches according to a preset masking rate to obtain first point cloud patches and second point cloud patches, wherein the first point cloud patches are visible point cloud patches, and the second point cloud patches are masked point cloud patches;

obtaining prediction information of the second point cloud patches according to information of the first point cloud patches and information of the second point cloud patches; and obtaining a prediction loss according to the information of the second point cloud patches and the prediction information of the second point cloud patches, and training the point cloud feature coding module according to the prediction loss.

5. The point cloud matching method of claim 4, wherein the obtaining the prediction information of the second point cloud patches according to the information of the first point cloud patches and the information of the second point cloud patches further comprises:

inputting coordinates of key points in the first point cloud patches to a preset visible position coding layer to obtain position code of the first point cloud patches;

inputting coordinates of key points in the second point cloud patches to a preset mask position coding layer to obtain position code of the second point cloud patches;

inputting the first point cloud patches and the second point cloud patches to a preset linear dimension raising layer to obtain first point cloud patches and second point cloud patches dimension-raised to a preset dimension;

inputting the first point cloud patches dimension-raised to the preset dimension to a preset first self-attention layer to obtain the feature vectors of the first point cloud patches;

adding the feature vectors of the first point cloud patches and the position code of the first point cloud patches, and splicing an addition result with the position code of the second point cloud patches to obtain a tensor of the to-be-trained point cloud; and inputting the tensor of the to-be-trained point cloud to a preset second self-attention layer to obtain predicted feature vectors of the second point cloud patches, wherein the predicted feature vectors are the prediction information.

6. The point cloud matching method of claim 5, wherein the obtaining the prediction loss according to the information of the second point cloud patches and the prediction information of the second point cloud patches further comprises:

acquiring a plurality of original vectors in the predicted feature vectors of the second point cloud patches and feature vectors of the second point cloud patches, acquiring replacement vectors corresponding to the plurality of original vectors from a preset vector library, and replacing the plurality of original vectors with the replacement vectors, wherein the feature vectors of the second point cloud patches are obtained by inputting the second point cloud patches dimension-raised to the preset dimension to the preset first self-attention layer;

determining feature vectors and predicted feature vectors of the second point cloud patches after replacing to be semantics of the second point cloud patches and predicted semantics of the second point cloud patches, respectively;

calculating a squared error between the semantics of the second point cloud patches and the predicted semantics of the second point cloud patches, wherein the squared error is a first prediction loss;

inputting the feature vectors of the second point cloud patches to a preset third self-attention layer and a linear dimension reducing layer to obtain predicted coordinates of each point in the second point cloud patches after dimension reduction;

calculating a chamfer distance between coordinates of the second point cloud patches and predicted coordinates of the second point cloud patches, wherein the chamfer distance is a second prediction loss; and determining a sum of the first prediction loss and the second prediction loss to be the prediction loss.

7. A non-transitory electronic apparatus, comprising a memory and a processor, wherein the memory stores a computer program, and the processor is configured to execute the computer program to perform the point cloud matching method of claim 1.

8. The non-transitory electronic apparatus of claim 7, wherein the dividing the to-be-matched point cloud into the plurality of matched point cloud patches, and inputting the plurality of matched point cloud patches to the pre-trained point cloud feature coding module to obtain the feature vectors of the plurality of matched point cloud patches further comprises:

inputting the plurality of matched point cloud patches to a preset linear dimension raising layer to acquire matched point cloud patches dimension-raised to a preset dimension; and inputting the matched point cloud patches dimension-raised to the preset dimension to a preset first self-attention layer to obtain the feature vectors of the plurality of matched point cloud patches.

9. The non-transitory electronic apparatus of claim 7, wherein the acquiring the global description vector of the to-be-matched point cloud according to the feature vectors of the plurality of matched point cloud patches further comprises:

acquiring a plurality of distance vectors from a preset vector library, wherein the distance vectors are vectors whose distances from the feature vectors of the plurality of matched point cloud patches are within a preset distance threshold range; and splicing the feature vectors of the plurality of matched point cloud patches with the plurality of distance vectors to obtain the global description vector of the to-be-matched point cloud.

10. The non-transitory electronic apparatus of claim 7, wherein, prior to the dividing the to-be-matched point cloud into the plurality of matched point cloud patches and inputting the plurality of matched point cloud patches to the pre-trained point cloud feature coding module, the method further comprises:

filtering a to-be-trained point cloud according to a preset height and radius;

voxelizing a filtered to-be-trained point cloud according to preset spatial resolution;

sampling a voxelized to-be-trained point cloud, and determining a plurality of points after sampling to be key points;

dividing the to-be-trained point cloud into a plurality of training point cloud patches according to the key points and a set of points within a preset range of the key points;

masking the plurality of training point cloud patches according to a preset masking rate to obtain first point cloud patches and second point cloud patches, wherein the first point cloud patches are visible point cloud patches, and the second point cloud patches are masked point cloud patches;

obtaining prediction information of the second point cloud patches according to information of the first point cloud patches and information of the second point cloud patches; and obtaining a prediction loss according to the information of the second point cloud patches and the prediction information of the second point cloud patches, and training the point cloud feature coding module according to the prediction loss.

11. The non-transitory electronic apparatus of claim 10, wherein the obtaining the prediction information of the second point cloud patches according to the information of the first point cloud patches and the information of the second point cloud patches further comprises:

inputting coordinates of key points in the first point cloud patches to a preset visible position coding layer to obtain position code of the first point cloud patches;

inputting coordinates of key points in the second point cloud patches to a preset mask position coding layer to obtain position code of the second point cloud patches;

inputting the first point cloud patches and the second point cloud patches to a preset linear dimension raising layer to obtain first point cloud patches and second point cloud patches dimension-raised to a preset dimension;

inputting the first point cloud patches dimension-raised to the preset dimension to a preset first self-attention layer to obtain the feature vectors of the first point cloud patches;

adding the feature vectors of the first point cloud patches and the position code of the first point cloud patches, and splicing an addition result with the position code of the second point cloud patches to obtain a tensor of the to-be-trained point cloud; and inputting the tensor of the to-be-trained point cloud to a preset second self-attention layer to obtain predicted feature vectors of the second point cloud patches, wherein the predicted feature vectors are the prediction information.

12. The non-transitory electronic apparatus of claim 11, wherein the obtaining the prediction loss according to the information of the second point cloud patches and the prediction information of the second point cloud patches further comprises:

acquiring a plurality of original vectors in the predicted feature vectors of the second point cloud patches and feature vectors of the second point cloud patches, acquiring replacement vectors corresponding to the plurality of original vectors from a preset vector library, and replacing the plurality of original vectors with the replacement vectors; wherein the feature vectors of the second point cloud patches are obtained by inputting the second point cloud patches dimension-raised to the preset dimension to the preset first self-attention layer;

determining feature vectors and predicted feature vectors of the second point cloud patches after replacing to be semantics of the second point cloud patches and predicted semantics of the second point cloud patches, respectively;

calculating a squared error between the semantics of the second point cloud patches and the predicted semantics of the second point cloud patches, wherein the squared error is a first prediction loss;

inputting the feature vectors of the second point cloud patches to a preset third self-attention layer and a linear dimension reducing layer to obtain predicted coordinates of each point in the second point cloud patches after dimension reduction;

calculating a chamfer distance between coordinates of the second point cloud patches and predicted coordinates of the second point cloud patches, wherein the chamfer distance is a second prediction loss; and determining a sum of the first prediction loss and the second prediction loss to be the prediction loss.

13. A non-transitory computer-readable storage medium, storing a computer program, wherein the computer program is executed by a processor to implement steps of the point cloud matching method of claim 1.

14. The non-transitory computer-readable storage medium of claim 13, wherein the dividing the to-be-matched point cloud into the plurality of matched point cloud patches, and inputting the plurality of matched point cloud patches to the pre-trained point cloud feature coding module to obtain the feature vectors of the plurality of matched point cloud patches further comprises:

inputting the plurality of matched point cloud patches to a preset linear dimension raising layer to acquire matched point cloud patches dimension-raised to a preset dimension; and inputting the matched point cloud patches dimension-raised to the preset dimension to a preset first self-attention layer to obtain the feature vectors of the plurality of matched point cloud patches.

15. The non-transitory computer-readable storage medium of claim 13, wherein the acquiring the global description vector of the to-be-matched point cloud according to the feature vectors of the plurality of matched point cloud patches further comprises:

acquiring a plurality of distance vectors from a preset vector library, wherein the distance vectors are vectors whose distances from the feature vectors of the plurality of matched point cloud patches are within a preset distance threshold range; and splicing the feature vectors of the plurality of matched point cloud patches with the plurality of distance vectors to obtain the global description vector of the to-be-matched point cloud.

16. The non-transitory computer-readable storage medium of claim 13, wherein prior to the dividing the to-be-matched point cloud into the plurality of matched point cloud patches and inputting the plurality of matched point cloud patches to the pre-trained point cloud feature coding module, the method further comprises:

filtering a to-be-trained point cloud according to a preset height and radius;

voxelizing a filtered to-be-trained point cloud according to preset spatial resolution;

sampling a voxelized to-be-trained point cloud, and determining a plurality of points after sampling to be key points;

dividing the to-be-trained point cloud into a plurality of training point cloud patches according to the key points and a set of points within a preset range of the key points;

masking the plurality of training point cloud patches according to a preset masking rate to obtain first point cloud patches and second point cloud patches, wherein the first point cloud patches are visible point cloud patches, and the second point cloud patches are masked point cloud patches;

obtaining prediction information of the second point cloud patches according to information of the first point cloud patches and information of the second point cloud patches; and obtaining a prediction loss according to the information of the second point cloud patches and the prediction information of the second point cloud patches, and training the point cloud feature coding module according to the prediction loss.

* * * * *